(No Model.)
H. COBB.
SPRING TOOTH HARROW.
No. 266,348. Patented Oct. 24, 1882.
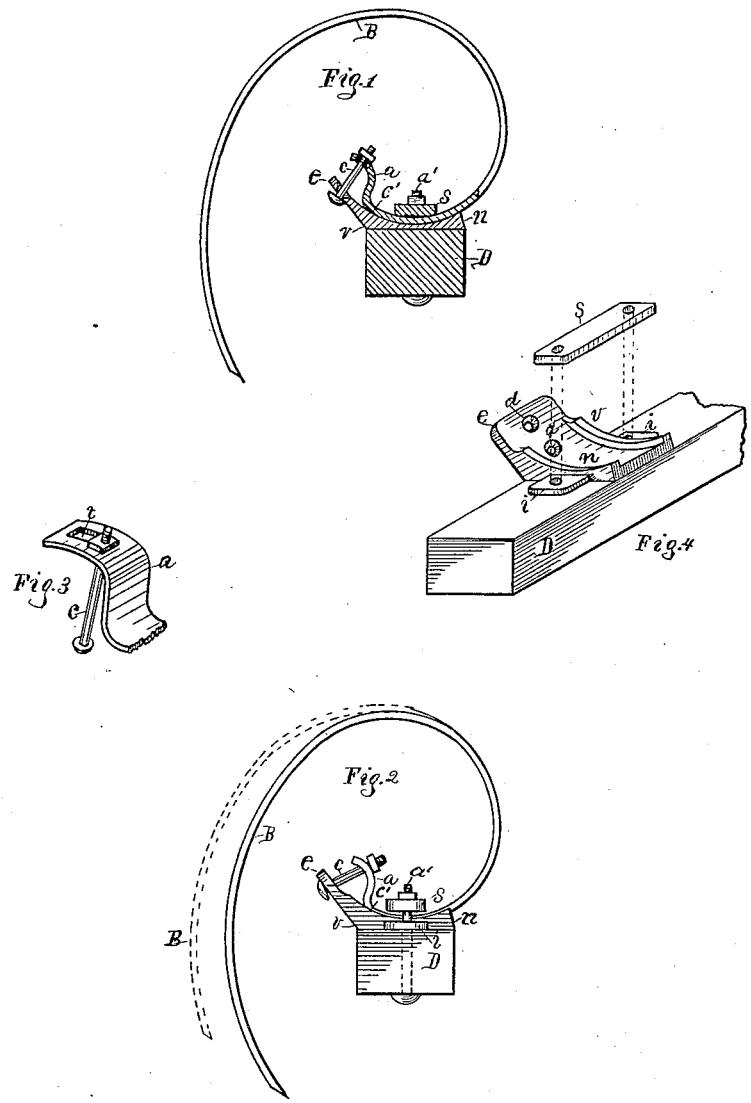
Attest.
John C Perkins.
J. L. West
Inventor.
Hiram Cobb
By Lucius C. West
Attorney

UNITED STATES PATENT OFFICE.

HIRAM COBB, OF KALAMAZOO, MICHIGAN.

SPRING-TOOTH HARROW.

SPECIFICATION forming part of Letters Patent No. 266,348, dated October 24, 1882.

Application filed June 28, 1881. (No model.)

*To all whom it may concern:*

Be it known that I, HIRAM COBB, of Kalamazoo, in the county of Kalamazoo and State of Michigan, have invented certain new and useful Improvements in Spring-Tooth Harrows, of which the following is a specification.

My invention relates to a mode of holding and adjusting the teeth of this class of implements. I find that when secured between two smooth surfaces, however rigid, they will work loose. Prior inventors have sought to overcome this difficulty in a number of ways, the most common being to corrugate the engaging parts and to perforate the tooth-shank for inserting bolts where the main strain on the tooth is located. The former is objectionable, because the corrugations readily pack full of earth and retard the adjustment of the tooth, and the latter weakens the tooth, and both fix the degree of adjustment at given points.

The object of my invention is to prevent the tooth from slipping by an arrangement which obviates the above difficulties and effects certain other useful and novel results, which will appear in the detailed description.

In the drawings forming a part of this specification, Figure 1 is a cross-section of my improved construction; Fig. 2, end and edge view; Fig. 3, broken portion showing extension to the tooth-shank; and Fig. 4 is a perspective of a tooth seat or holder.

D is a tooth-beam, provided with a casting having a concave seat, $n$, which, together with the binding-bar $s$ and bolts $a'$ $a'$, constitutes a common form of tooth-holder. I provide this seat-casting with a rearward and upward extension, $e$, from $r$, the inner surface of which forms a circular continuation of the concave seat $n$ on the same plane therewith. This extension $e$ is formed with a funnel-shaped orifice, $d$, the use of which is hereinafter explained.

B is a common form of curved-shank spring tooth, except it is provided with the upward and rearward extension $a$, having the elongated slot $t$. Locking-bolt $c$ is located in slot $t$ and orifice $d$, as shown in Figs. 1, 2, and 3.

When the plate $s$ is bound rigidly down on the shank of the tooth by turning nuts of binding-bolts $a'$ $a$, in the usual manner, the tooth, but for my improvements, would still work loose in its seat $n$. To illustrate: In Fig. 1 the shank of the tooth is thus bound by bar $s$, and, by the nut of the locking-bolt $c$ being firmly turned down on the top of extension $a$, the same yielding downward under this pressure, a purchase of the shank against the seat at $c'$ is brought to bear, which, with the purchase on the binding-bar $s$, absolutely prevents the tooth from slipping in the holder, and all needed strength is retained. The novel result effected by having hole $t$ elongated and hole $d$ funnel-shaped is that by loosening bar $s$ from the shank, as in Fig. 2, the tooth can be turned or moved in the holder without loosening the nut of the locking-bolt $c$, and then by binding the bar $s$ down again the tooth is secured the same as before the adjustment—that is, the purchase at $c'$ is again effected without disturbing the bolt $c$ or its nut. By loosening both the binding-bar $s$ and the nut of bolt $c$ the elasticity of the tooth is not called into use, for, owing to the funnel form of hole $d$ and the elongation of hole $t$, the tooth would gently play over the soil, merely scratching its surface. The harrow might be used thus to advantage in harrowing in very small seed, such as grass and clover.

Having thus described my device, what I claim as new, and desire to secure by Letters Patent, is—

The combination, with a tooth-beam provided with a concave seat having the rearward and upward extension formed with the funnel-shaped orifice, and a binding-bar, of a spring harrow-tooth having the curved shank provided with the rearward and upward extension having the elongated slot, and the locking-bolt, all substantially as described and shown.

HIRAM COBB.

Witnesses:
 AMOS D. ALLEN,
 CHARLES C. JENNINGS.